United States Patent [19]

Faccia

[11] Patent Number: 5,020,918
[45] Date of Patent: Jun. 4, 1991

[54] MIXER TRAILER FOR FIBROUS PRODUCTS

[76] Inventor: Tiziano Faccia, Via Padova 102, 35026 Conselve (Province of Padova), Italy

[21] Appl. No.: 511,174

[22] Filed: Apr. 19, 1990

[30] Foreign Application Priority Data

Apr. 19, 1989 [IT] Italy .............................. 41577 A/89

[51] Int. Cl.$^5$ ........................ B01F 7/24; B01F 15/06
[52] U.S. Cl. .................................. 366/279; 366/266; 366/603; 366/144
[58] Field of Search ............... 366/279, 186, 603, 144, 366/145, 146, 147, 196, 247, 249, 250, 251, 266, 318, 319

[56] References Cited

U.S. PATENT DOCUMENTS

| | | | |
|---|---|---|---|
| 2,800,238 | 7/1957 | Oliver | 366/603 |
| 3,133,727 | 5/1964 | Luscombe | 366/603 |
| 4,092,014 | 5/1978 | Hughes | 366/603 |
| 4,765,747 | 8/1988 | High | 366/186 |

Primary Examiner—Robert W. Jenkins
Attorney, Agent, or Firm—Birch, Stewart, Kolasch & Birch

[57] ABSTRACT

The present invention relates to an improved mixer trailer for fibrous products which can be particularly but not exclusively used in the zootechnical field. The trailer is of the type which comprises a wheeled chassis on which a mixing container is mounted; the container is substantially in the shape of an inverted conical frustum and is internally provided with one or more vertical scrolls welded to a rotating shaft which is rigidly associated with the container. The improvements consist of the fact that the wheels are arranged in close pairs which are coupled to a same axis of rotation and are articulated to the chassis on an axis which is orthogonal to the axis of rotation. A loading device with grippers is associated with the container, and a system for drying the product contained therein is associable therewith. At the end of operation, auxiliary actuation means adapted to impart to each of the one or more scrolls a high-speed rotary motion can be connected to each of these one or more scrolls.

11 Claims, 3 Drawing Sheets

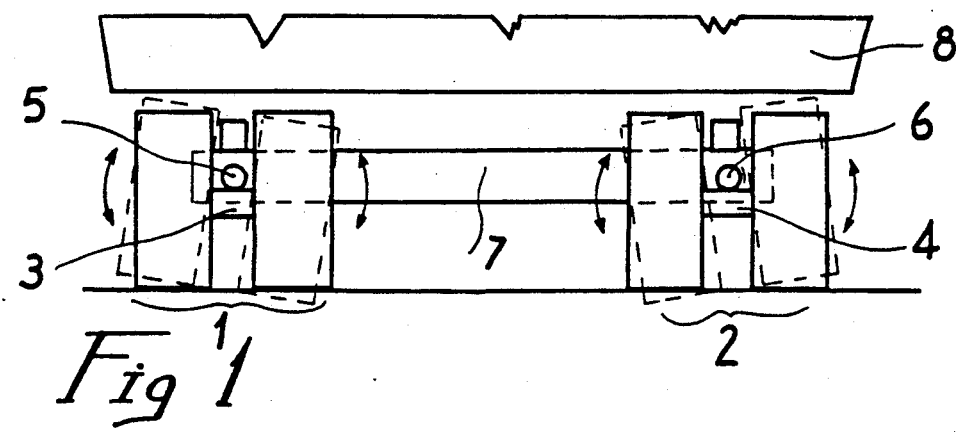
Fig 1
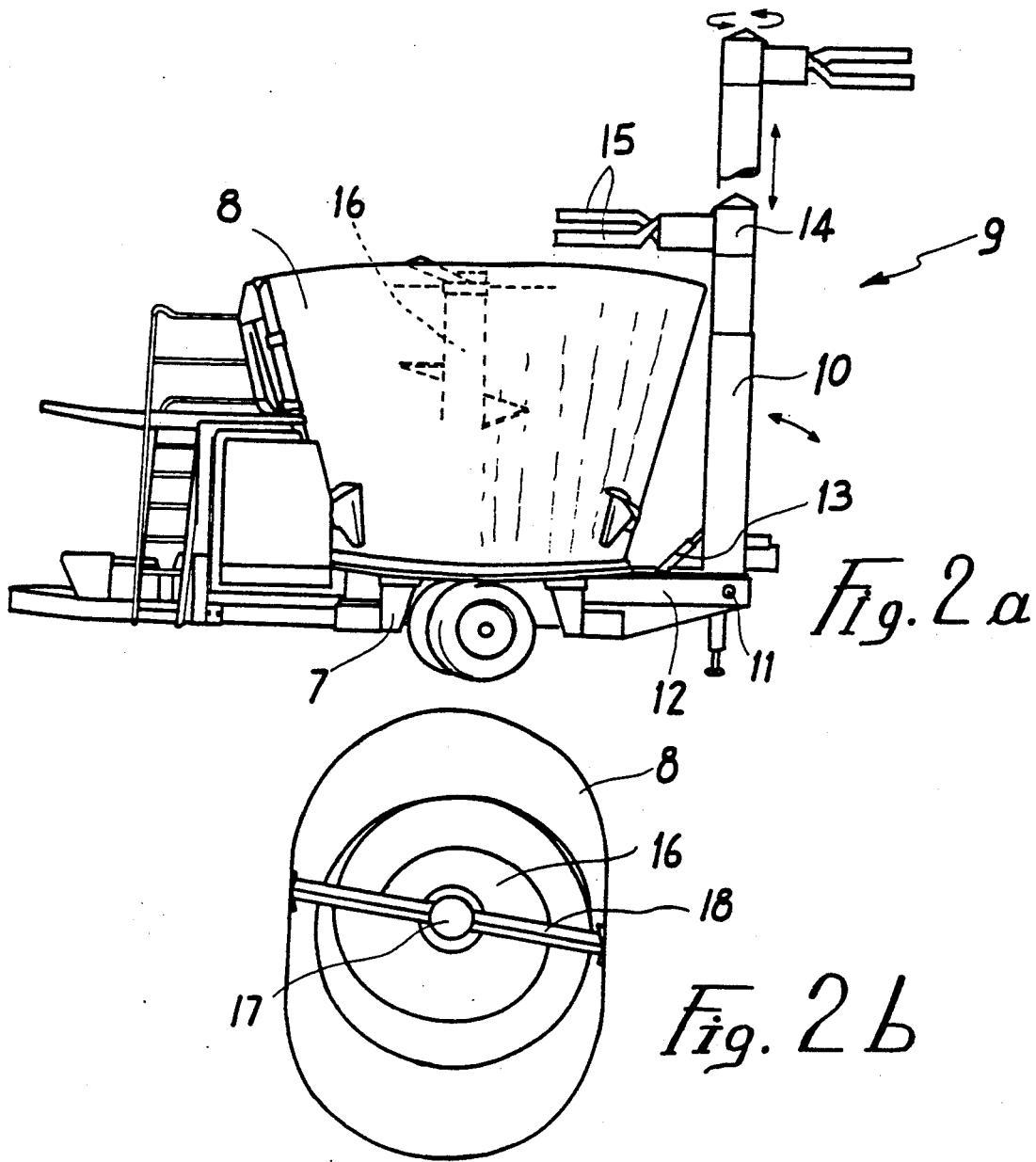
Fig. 2a
Fig. 2b

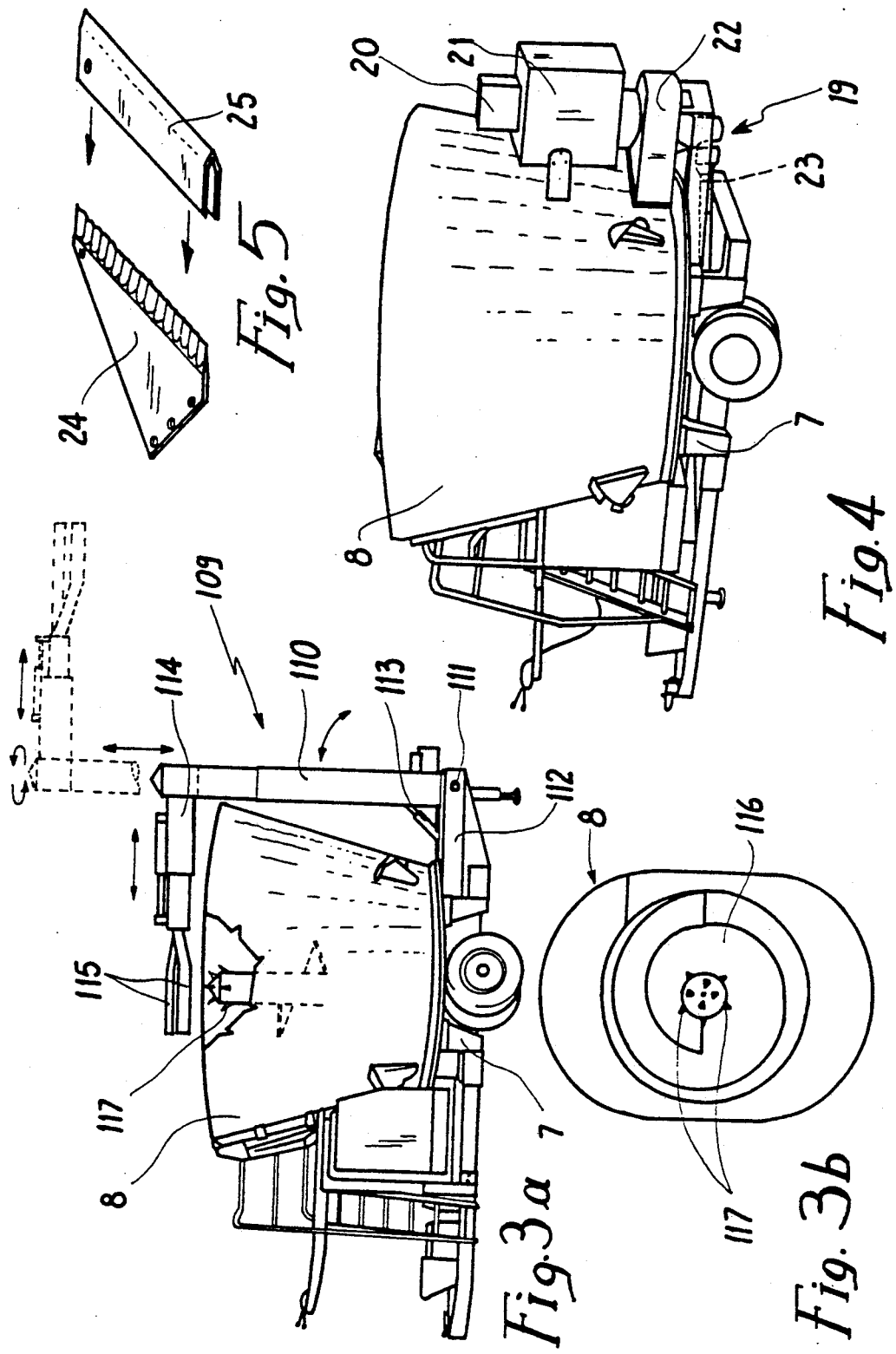

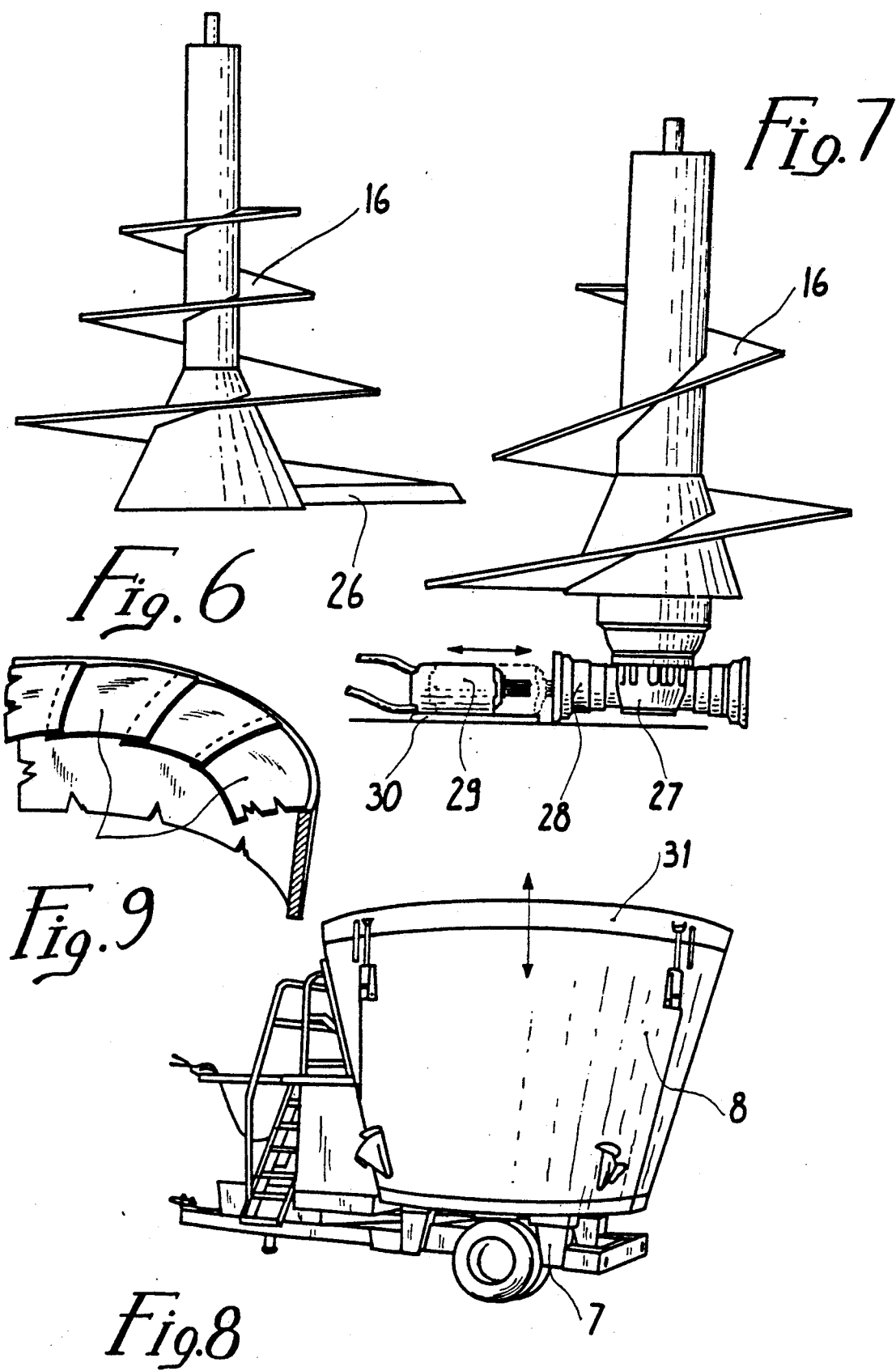

MIXER TRAILER FOR FIBROUS PRODUCTS

BACKGROUND OF THE INVENTION

The present invention relates to an improved mixer trailer which can be used particularly for fibrous products in the zootechnical field but can also be adopted in the industrial field.

Mixer trailers are already known and are substantially constituted by a wheeled chassis above which a container is fixed; said container substantially has the shape of an inverted conical frustum, and one or more scrolls are arranged vertically inside it; each scroll is welded to a rotating shaft which is coupled to the container and is rotated by appropriate mechanical transmissions connected to actuation elements.

Though they perform their functions optimally, said known mixer trailers are not, however, free from disadvantages, including a certain difficulty in towing due to their weight and the fact that they necessarily must be provided with wheels of considerable width.

Other disadvantages are for example constituted by a certain difficulty in loading bales of fibrous products.

Further disadvantages consist in that at the end of operation it is not currently possible to completely clean the scrolls and the container, in which a considerable amount of product remains.

SUMMARY OF THE INVENTION

The aim of the present invention is to provide improvements to a mixer trailer for fibrous products which solve the disadvantages existing in known trailers and give said trailers even greater characteristics of operational flexibility and of possibility of use for the users.

A consequent primary object is to provide improvements which can also be applied to mixer trailers currently already in use.

Not least object is to provide improvements which can be executed at low cost with current production systems.

This aim, these objects and others which will become apparent hereinafter are achieved by improvements to a mixer trailer for fibrous products, of the kind which comprises a wheeled chassis on which a mixing container is mounted, said container having substantially the shape of an inverted conical frustum and being internally provided with at least one vertical scroll welded to a rotating shaft which is coupled to said container, characterized in that said wheels are in close pairs coupled to a same axis of rotation and are articulated to the chassis on an axis which is orthogonal to said axis of rotation, a loading device with grippers being fixed to said container, a system for drying the product contained therein being associable with the container itself, auxiliary actuation means being connectable, at the end of operation, to said at least one scroll, imparting thereto a high-speed rotary motion.

BRIEF DESCRIPTION OF THE DRAWINGS

Further characteristics and advantages of the invention will become apparent from the detailed description of one embodiment thereof, illustrated only by way of nonlimitative example in the accompanying drawings, wherein:

FIG. 1 is a schematic view of the coupling of the wheels to the chassis which supports the body of the trailer;

FIGS. 2a and 2b are a side view and a top view of a mixer trailer provided with a loading device with grippers and with a scroll which rotates on two end supports;

FIGS. 3a and 3b are a side view and a top view of a mixer trailer provided with a loading device with grippers, with a scroll which rotates on a single base support;

FIG. 4 is a perspective view of a mixer trailer provided with a system for drying the products contained therein;

FIGS. 5 and 6 are views respectively of a blade cover to be applied to the blades of the scroll in case of use as drying container and of a blade for scraping the bottom of the body, also to be used in said case;

FIG. 7 is a view of a hydraulic motor adapted to actuate the scroll at high speed at the end of operation;

FIG. 8 is a side view of a mixer trailer the container whereof has a raised upper edge which is slidably associated therewith;

FIG. 9 is a detail view of a sort of elastic crown which can be applied to the edge of the container to convey the material being processed.

DESCRIPTION OF THE PREFERRED EMBODIMENT

With reference to the above FIG. 1, according to the invention the wheels of the trailer, which are arranged coaxially, are rigidly associated in pairs, respectively indicated by the reference numerals 1 and 2, with a same axis of rotation, respectively 3 and 4.

Each of said axes is in turn oscillably coupled to a pivot, respectively 5 and 6, which is rotationally coupled to the chassis 7 which supports the container 8.

Each pair of wheels is therefore a part of a rocker device which allows to improve the grip of the wheels if there are holes in the road or a semicircular shape of the grip of said wheels in the portions of road which have holes or which have a bed with convex transverse profile.

As can be seen in FIGS. 2a and 2b, a loading device with grippers, generally indicated by the reference numeral 9, is applied to the mixer trailer and comprises a telescoping upright 10 which is articulated in a downward position to a pivot 11 which is coupled to a tab 12 which extends from the frame and is actuated by a piston 13 adapted to make it perform oscillating motions.

A rotating support 14 is axially coupled on the top of said telescoping upright 10 and supports, at its end, a pair of grippers 15 which are orthogonal to said upright and are adapted to pick up bales of straw or hay and deposit them on the container 8.

In this case the scroll, indicated by 16, is coupled to the container by means of two terminal rotation supports; the upper one 17 is fixed by means of a known crosspiece 18 and its edge can scrape the bottom of the container with a profile which has a non-radial direction in order to graduate the take-up of material.

FIGS. 3a and 3b illustrate a variated embodiment of the trailer with gripper loading device, now indicated by 109.

The device 109 is again constituted by a telescoping upright 110 which is articulated, in a downward position, to a pivot 111 which is fixed to a tab 112 which extends from the frame 7.

The device 109 is again oscillably actuated by a piston 113 and has, at its end, a rotating support 114 which in this case is telescoping and can deposit the bales of straw or hay in any position by means of the pair of grippers 115.

As can be seen in the figures, the scroll 116 in this case is projecting and therefore rotates on a single pivot at its base; said scroll is provided, at its end, with blades 117 adapted to shred the loaded material.

With reference to the above FIGS. 4 to 6, it is possible to apply to the mixer trailer a drying device, generally indicated by the reference numeral 19, substantially constituted by a burner 20 and by a boiler 21 for heating the air which a fan 22 coupled thereto feeds to the inside of the container 8 through an appropriate inlet on which it is mounted.

The fan 22 can be actuated electrically or, as illustrated in the figure, can be actuated by a cardan shaft 23 which connects it to the reduction unit of the trailer.

The mixer trailer can thus become suitable for the drying of the products contained therein, which for this purpose may be maize or any other product in grains or other.

For this purpose, the blades 24 fixed to the scroll 16 must be provided with appropriate blade covers 25, whereas on the bottom the scroll is provided with a blade 26 for scraping the bottom of the container.

The drying system 19 may naturally be mounted and disassembled from the container depending on the requirements, an appropriate lid, not illustrated, being applied on the hole of the fan, or the boiler can be detached from the machine and be connected thereto by means of a conveyor.

With reference to FIG. 7, the scroll 16 of the trailer can have the speed reduction unit 27 provided with a coupling 28 for a hydraulic motor 29 which is slidable on a rail 30.

The hydraulic motor 29 can be connected only when the machine has finished unloading the product, imparting a greater speed to the scroll so as to allow it to unload the residual material left on it.

Finally, with reference to the above FIG. 8, the container 8 can be provided with an edge 31 which is raised on its upper top and slidably coupled thereto with a hydraulic adjustment, said edge extending on all or part of the perimeter and being adapted to facilitate loading and to avoid overflows during the processing of the material introduced.

As can be seen in FIG. 9, rubber laminas 32, partially superimposed so as to form an elastic crown adapted to convey the material during processing, can be applied orthogonally to said edge 31.

Said edge can conveniently also be fixed and have a conical frustum like shape.

The described improvements contribute to increase the qualitative yield of known mixer trailers for fibrous products and at the same time increase operativity and convenience of use for operators.

The invention thus conceived is susceptible to numerous modifications and variations, all of which are within the scope of the inventive concept.

All the details may furthermore be replaced with other technically equivalent elements.

In practice, the materials employed, as well as the dimensions, may be any according to the requirements.

I claim:

1. Improved mixer trailer for fibrous products of the kind which comprises a wheeled chassis on which a mixing container is mounted, said mixing container being substantially in the shape of an inverted conical frustum and being internally provided with at least one vertical scroll which is welded to a rotating shaft which is coupled to the container wherein said wheels are in close pairs associated with a same axis of rotation and articulated to the chassis on an axis which is orthogonal to said axis of rotation, a loading device with grippers being fixed to said container, a system for drying the product contained in said container being fixed thereto, auxiliary actuation means being connectable at the end of operation to said at least one scroll, imparting thereto a high speed rotary motion.

2. Trailer according to claim 1, wherein said pairs of wheels are coaxial in pairs, the axis of rotation of each pair being fixed to an orthogonal pivot which is articulated to said chassis which makes it susceptible to oscillating motions.

3. Trailer according to claim 1, wherein said gripper loading device comprises a telescoping upright which is articulated, in a downward position, to a pivot which is fixed to a tab which extends from the chassis of the trailer, said upright being actuated by a hydraulic piston and having, on its top, a rotating support which supports a pair of grippers arranged orthogonal to said upright.

4. Trailer according to claim 3, wherein said rotating support can be telescoping and extending orthogonally to said upright.

5. Trailer according to claim 1, wherein said scroll can be coupled to said container by means of a single base rotation support.

6. Trailer according to claim 1, wherein said scroll can have, on its top, blades adapted to shred the loaded product.

7. Trailer according to claim 1, wherein said drying system comprises a burner, a boiler associated therewith and a fan with preferably cardan joint or electric actuation, adapted to blow warm air to the inside of said container through an appropriate lateral inlet, said drying system being detachable from the container and said inlet being closeable, said boiler being possibly detached from the machine and connected thereto by means of a conveyor.

8. Trailer according to claim 7, wherein the blades of said scroll can have blade covers in case of operation of the trailer as dryer, said scroll having a blade for scraping the body bottom.

9. Trailer according to claim 1, wherein said auxiliary actuation means are constituted by a hydraulic motor which is slidable on a rail and is associable with a coupling with which the reduction unit of said scroll is provided.

10. Trailer according to claim 1, wherein said container can have an upper edge which is fixed or slidably coupled thereto and is adapted to facilitate loading and avoid overflows of the product being processed, said edge extending on all of the perimeter or part thereof.

11. Trailer according to claim 1, wherein the scroll can have a bottom scraping edge of the container with an opposite advancement with respect to the radial direction so as to graduate the take-up of the product.

* * * * *